United States Patent
Baumgarten et al.

(10) Patent No.: US 10,126,929 B2
(45) Date of Patent: Nov. 13, 2018

(54) AGRICULTURAL WORK MACHINE

(71) Applicant: CLAAS Selbstfahrende Ernternaschinen GmbH, Harsewinkel (DE)

(72) Inventors: Joachim Baumgarten, Beelen (DE); Andreas Wilken, Bissendorf (DE); Christoph Heitmann, Warendorf (DE); Bastian Bormann, Gütersloh (DE); Sebastian Neu, Bad Laer (DE); Christoph Bussmann, Harsewinkel (DE); Klaus Schäfer, Oelde (DE); Henner Vöcking, Rietberg (DE); Arthur Berger, Georgsmarienhütte (DE); Stefan Terörde, Warendorf (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 238 days.

(21) Appl. No.: 15/354,688

(22) Filed: Nov. 17, 2016

(65) Prior Publication Data

US 2017/0160916 A1    Jun. 8, 2017

(30) Foreign Application Priority Data

Dec. 7, 2015    (DE) .......................... 10 2015 121 210

(51) Int. Cl.
  *A01D 41/127*    (2006.01)
  *G06F 3/0484*    (2013.01)
  (Continued)

(52) U.S. Cl.
  CPC ....... *G06F 3/04847* (2013.01); *A01D 41/127* (2013.01); *A01D 41/1277* (2013.01);
  (Continued)

(58) Field of Classification Search
  CPC ..................................................... A01D 41/127
  (Continued)

(56) References Cited

U.S. PATENT DOCUMENTS

| 8,406,964 B2* | 3/2013 | Baumgarten ........ A01D 41/127 701/50 |
| 8,935,060 B2* | 1/2015 | Baumgarten ........ A01D 41/127 460/114 |

(Continued)

FOREIGN PATENT DOCUMENTS

| EP | 2220926 B1 | 12/2011 |
| EP | 2 687 923 A2 | 1/2014 |

(Continued)

OTHER PUBLICATIONS

European Search Report for EP Application No. 16184738, dated Feb. 1, 2017.

*Primary Examiner* — William D Titcomb
(74) *Attorney, Agent, or Firm* — Lempia Summerfield Katz LLC (57) ABSTRACT

An agricultural work machine for processing an agricultural work process, having numerous working units (1-5) and having a driver assistance system (10) for controlling the working units (1-5) according to at least one user-side specifiable work process strategy (A), which is aimed at fulfilling at least one quality criterion (Q), wherein the driver assistance system (10) comprises a memory (11) for storing data, and a computing device (12) for processing the data stored in the memory (11), wherein the driver assistance system (10) has a graphical user interface (14), via which at least a portion of the work process strategy (A) can be specified by a user. It is proposed that competing quality criteria (Q) that are weighted in relation to one another in accordance with a weighting variable (G) are entered into the work process strategy (A), and that the weighting (Continued)

variable (G) is visualized and can be specified by a user via a virtual operating element (16-19) of the graphical user interface (14).

20 Claims, 4 Drawing Sheets

(51) Int. Cl.
*B60K 35/00* (2006.01)
*G06F 3/0486* (2013.01)
*G06F 3/14* (2006.01)
*G06F 3/0488* (2013.01)

(52) U.S. Cl.
CPC ............ *B60K 35/00* (2013.01); *G06F 3/0486* (2013.01); *G06F 3/14* (2013.01); *G06F 3/0488* (2013.01)

(58) Field of Classification Search
USPC .......................................................... 715/769
See application file for complete search history.

(56) References Cited

U.S. PATENT DOCUMENTS

| | | | | |
|---|---|---|---|---|
| 9,002,594 B2* | 4/2015 | Wilken | ................... | G05B 11/06 |
| | | | | 701/50 |
| 9,043,956 B2* | 6/2015 | Baumgarten | .......... | B60K 28/06 |
| 9,125,344 B2* | 9/2015 | Baumgarten | .......... | G06Q 10/04 |
| 9,220,196 B2* | 12/2015 | Baumgarten | ........ | A01D 41/127 |
| 9,403,536 B2* | 8/2016 | Bollin | ................... | B60W 50/08 |
| 9,516,812 B2* | 12/2016 | Baumgarten | ........ | A01D 41/127 |
| 9,603,302 B2* | 3/2017 | Neu | ...................... | A01D 41/127 |
| 9,707,972 B2* | 7/2017 | Tuncer | ................ | B60W 50/085 |
| 9,756,786 B2* | 9/2017 | Heitmann | ........... | A01D 41/1273 |
| 2010/0217474 A1* | 8/2010 | Baumgarten | ........ | A01D 41/127 |
| | | | | 701/31.4 |
| 2012/0004812 A1* | 1/2012 | Baumgarten | ........ | A01D 41/127 |
| | | | | 701/50 |
| 2012/0004813 A1* | 1/2012 | Baumgarten | ........ | A01D 41/127 |
| | | | | 701/50 |
| 2014/0019017 A1* | 1/2014 | Wilken | ................... | G05B 11/06 |
| | | | | 701/50 |
| 2014/0019018 A1* | 1/2014 | Baumgarten | ........ | G05B 13/021 |
| | | | | 701/50 |
| 2014/0088840 A1* | 3/2014 | Baumgarten | .......... | B60K 28/06 |
| | | | | 701/50 |
| 2014/0129048 A1* | 5/2014 | Baumgarten | .......... | G06Q 10/00 |
| | | | | 701/1 |
| 2015/0046043 A1* | 2/2015 | Bollin | ................... | B60W 50/08 |
| | | | | 701/50 |
| 2015/0088386 A1* | 3/2015 | Neu | ...................... | A01D 41/127 |
| | | | | 701/50 |
| 2016/0052525 A1* | 2/2016 | Tuncer | ................ | B60W 50/085 |
| | | | | 701/50 |
| 2016/0088794 A1* | 3/2016 | Baumgarten | ........ | A01D 41/127 |
| | | | | 460/1 |

FOREIGN PATENT DOCUMENTS

| | | |
|---|---|---|
| EP | 2837279 A2 | 7/2014 |
| EP | 2987396 A1 | 7/2015 |

* cited by examiner

AGRICULTURAL WORK MACHINE

CROSS REFERENCE TO RELATED APPLICATION

This application claims priority to German Patent Application No. DE 102015121210.2, filed on Dec. 7, 2015, the entirety of which is hereby incorporated by reference herein.

TECHNICAL FIELD

An agricultural work machine is disclosed having the features of an agricultural work machine for processing an agricultural work process, the agricultural work machine having numerous working units and having a driver assistance system for controlling the working units. The driver assistance system may include an interactive graphical user interface providing tools for implementing a user-side specifiable work process strategy.

These machines can be any type of agricultural machine that serves to execute an agricultural work process, and which is equipped with numerous working units as well as a driver assistance system for controlling the working units. This includes, for example, towing vehicles, in particular tractors, self-driving harvesters, in particular forage harvesters, combine harvesters or suchlike. Presently, the work machine designed as a combine harvester is of primary interest.

BACKGROUND

A work machine designed as a combine harvester is used to mow and thresh grains. The threshing occurs thereby by means of a threshing unit, which obtains grain from the harvest collected by the combine harvester through the cutting unit, which is fed to a separating and subsequent cleansing in a grain tank after the threshing. As a further component of the harvest, the chaff and mulch, for example, remain, which is either distributed over the field, or—in the case of straw—can be laid on swath, e.g. to be collected later by means of a baler. Here and in the following, the term "harvest" is understood to mean everything that has been harvested by the thresher, thus including those grains that are not obtained as grain from the harvest, and potentially those grains that remain in the harvest as losses and will be discarded with the straw.

In the thresher, the grain is ground out of the straw by a fundamentally rolling processing—threshed out—and separated from the rest of the harvest, such that it can be fed directly into the cleansing. The rest of the harvest is then fed to the separating section, in which the remaining grain is separated from the harvest, e.g. by means of a shaker assembly, and is then likewise fed to the cleansing.

There are a large number of quality criteria, based on which the quality of the work process, the harvesting process in this case, can be evaluated. First, all of the grains should be removed from the harvest and fed into the grain tank, this being with as little fragmented grain as possible—grain fragments—and a low portion of non-grain in the grains. Second, if possible, the straw should not be destroyed and cut, for example, to the extent that it becomes difficult to make use of later. Third, the time required for processing a field should be kept short, or the fuel consumption should be kept as low as possible. Further quality criteria are conceivable here. Different quality criteria take on importance, depending on the overall situation, in particular depending on the respective economical framework, which are combined to form a work process strategy, in this case a harvesting strategy, for the execution of the work process, in this case the harvesting.

The fulfillment of the above quality criteria requires that the threshing unit and the other working units of the harvester are controlled in a specific manner. For this, a driver assistance system is provided, which controls the working unit according to at least one work process strategy that can be defined by a user, which is aimed at fulfilling at least one quality criterion.

The known agricultural work machine (EP 2 220 926 B 1), includes such a driver assistance system. The driver assistance system has a graphical user interface, by means of which at least a portion of the work process strategy can be specified by a user. For this, the user can specify the desired quality criteria of the work process strategy via a natural language communication sequence. If the user specifies competing quality criteria, which cannot be fulfilled simultaneously, the driver assistance system reacts, preferably with an appropriate warning.

The known agricultural work machine enables an intuitive input of the work process strategy in numerous steps with its driver assistance system. It is disadvantageous that the specification of competing quality criteria may lead to additional input steps, if the user specifies competing quality criteria that cannot be fulfilled simultaneously.

SUMMARY

The agricultural work machine, and the corresponding methods for operating such agricultural work machine, described in this disclosure includes embodiments that address the problem of designing and developing the known agricultural work machines such that the user-side specification of the work process strategy is simplified.

The above problem is solved by the agricultural work machine described herein that is configured to process an agricultural work process. The agricultural work machine includes numerous working units and a driver assistance system configured to control the working units. The driver assistance system includes an interactive graphical user interface providing tools for implementing a user-side specifiable work process strategy.

A feature of the driver assistance system provides for the consideration of competing quality criteria, which cannot be fulfilled simultaneously, weighted in relation to one another in accordance with a weighting variable. The weighting strategy for the competing quality criteria may be entered into the work process strategy, wherein the weighting variable is visualized via a virtual operating element of the graphical user interface, and can be specified by the user. The user is limited thereby in specifying the quality criteria, because the changing of the weighting variable is always accompanied by an opposite change in the weighting of the competing quality criteria. This is appropriate, however, because competing quality criteria cannot be fulfilled simultaneously anyway. The result is that the warning necessary in the prior art is no longer necessary when quality criteria have been specified that cannot be implemented in practice. On the whole this results in a shortening of the user-side specification of the work process strategy.

Numerous weighting variables may be provided, which are assigned to respective competing quality criteria. According to some embodiments, the competing quality criteria may be assigned a weighting variable in pairs, where each pairing weighting variable is represented by an interactive virtual operating element visualized on the graphical user interface and controllable by a user input to the virtual operating element. It is, however, also conceivable for a weighting variable to be assigned numerous quality criteria, in particular three quality criteria, which compete with one another, in part.

By offering the virtual operating element as a drag-and-drop tool, or alternatively a virtual sliding adjuster tool or virtual rotating adjuster tool, the graphical user interface provides a particularly user-friendly data input mechanism for inputting the respective weighting variable. For example, the drag-and-drop tool, virtual sliding adjuster tool, and/or virtual rotating adjuster tool versions of the virtual operating element may be implemented in combination with a touchscreen type of display screen included in the driver assistance system described herein.

According to exemplary embodiments, the agricultural work machine may be a combine harvester including a plurality of working units such as a cutting unit, threshing unit, separator assembly, cleansing assembly, and distribution assembly. With a combine harvester, there are a number of quality criteria that may compete with one another. One example of this is the quality criterion of maximizing the threshing output, which can be obtained through an aggressive activation of the threshing unit. Such an aggressive activation is, however, associated at the same time with the fundamental risk of increasing the portion of fragmented grains. Thus the quality criteria of maximizing the threshing output and minimizing the fragmented grain portion concern two competing quality criteria as set forth above.

The driver assistance system included on the agricultural work machine may include circuitry for implementing a work process. The driver assistance system may further include circuitry for generating an interactive graphical user interface, and for adapting the graphical user interface to the machine configuration and/or the control configuration and/or the status of the work process. Depending on the current configuration or combination, the drive assistance system visualizes different quality criteria competing with one another, such that only those quality criteria that are actually relevant for the respective current configuration or combination can be specified by the user.

Competing quality criteria that are weighted in relation to one another in accordance with the weighting variable are entered into the work process strategy, and that the weighting variable is visualized via a virtual operating element of the graphical user interface, and is specified by the user. In explanation of the method according to the proposal, reference may be made to all designs for an agricultural work machine according to the proposal.

BRIEF DESCRIPTION OF THE DRAWINGS

The embodiments shall be explained in greater detail below based on drawings showing only one exemplary embodiment. In the drawings.

DETAILED DESCRIPTION

Figure 1:
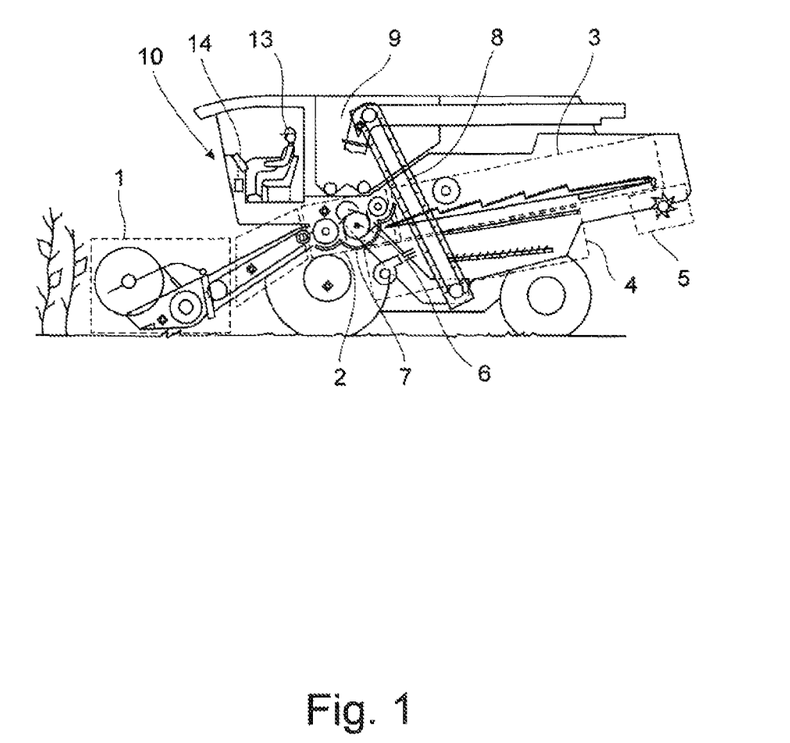
FIG. 1 shows an agricultural work machine according to the proposal in an entirely schematic depiction.

The agricultural work machine depicted in FIG. 1 is used for executing an agricultural work process. For exemplary purposes, the work machine is a combine harvester, which serves to execute a harvesting process. The solution according to the proposal can be applied to all other agricultural work machines specified in the introduction. All of the following designs relate almost invariably to a work machine designed as a combine harvester. These designs apply to all other types of agricultural work machines accordingly.

The depicted work machine includes the following working units: cutting unit 1, threshing unit 2, separator assembly 3, cleansing assembly 4 and distribution assembly 5.

While the cutting unit 1 serves to cut and collect the harvest, the threshing unit 2 is used to thresh the collected harvest to obtain grain. The harvest is understood to be all of the material collected from the field and fed into the threshing unit 2, wherein the grain then refers to the grains obtained from the harvest by the combine harvester.

The threshing unit 2 is equipped with a threshing drum 6, which interacts with threshing basket 7. The harvest flow fed into the threshing unit 2 is subsequently fed to the separator assembly 3, without the already obtained grain.

Fundamentally, the threshing unit 2 serves to grind out the main portion of the grain from the harvest through the threshing process. The harvest is then moved, e.g. shaken, in the separator assembly 3 with the remaining grain portion, such that as much as the remaining grain as possible is separated from the straw and other harvest. The grain obtained in the threshing unit 2 and the separator assembly 3 is then fed to a cleansing assembly 4. Non-grain components, e.g. chaff and straw portions, as well as material that was not threshed out, such as head tips and awns, that are still mixed in with the grain, are then separated from the grain in the cleansing assembly 4, which is normally a multi-step assembly. Subsequently, the cleansed grain is conveyed to a grain tank 9 via a transport assembly 8, e.g. a grain elevator. The threshed out straw—thus the remaining harvest in the separator assembly 3—is discarded by the combine harvester, e.g. as swath along the driving path.

A threshing unit 2 such as described above can be controlled through the specification of different machine parameters. These include, depending on the construction of the threshing unit 2, drive parameters, such as a drum rotational rate or other movement operating figures for the threshing drum, as well as a basket size—i.e., the spacing between the threshing drum 6 and the threshing basket 7. If the threshing unit 2 includes awner flaps, these may be adjusted in the framework of the controlling of the threshing unit 2.

The work machine according to the proposal furthermore has a driver assistance system 10 for controlling the working units 1-5. This driver assistance system 10 comprises a memory 11 for storing data—thus a memory in the information technology sense—and a computing device 12, for processing the data stored in the memory 11. The computing device 12 may include a processor or other controller for controlling one or more components of the driver assistance system 10 and one or more components of the work machine. The data stored on the memory 11 may include processor executable instructions that, when executed by the processor of the computing device 12, cause the computing device 12 to implement the features described herein. Fundamentally, the driver assistance system 10 is configured to support a user 13 of the work machine in the operation of the work machine. The driver assistance system 10, having the memory 11 and the computing device 12 is shown schematically in FIG. 2.

Figure 2:
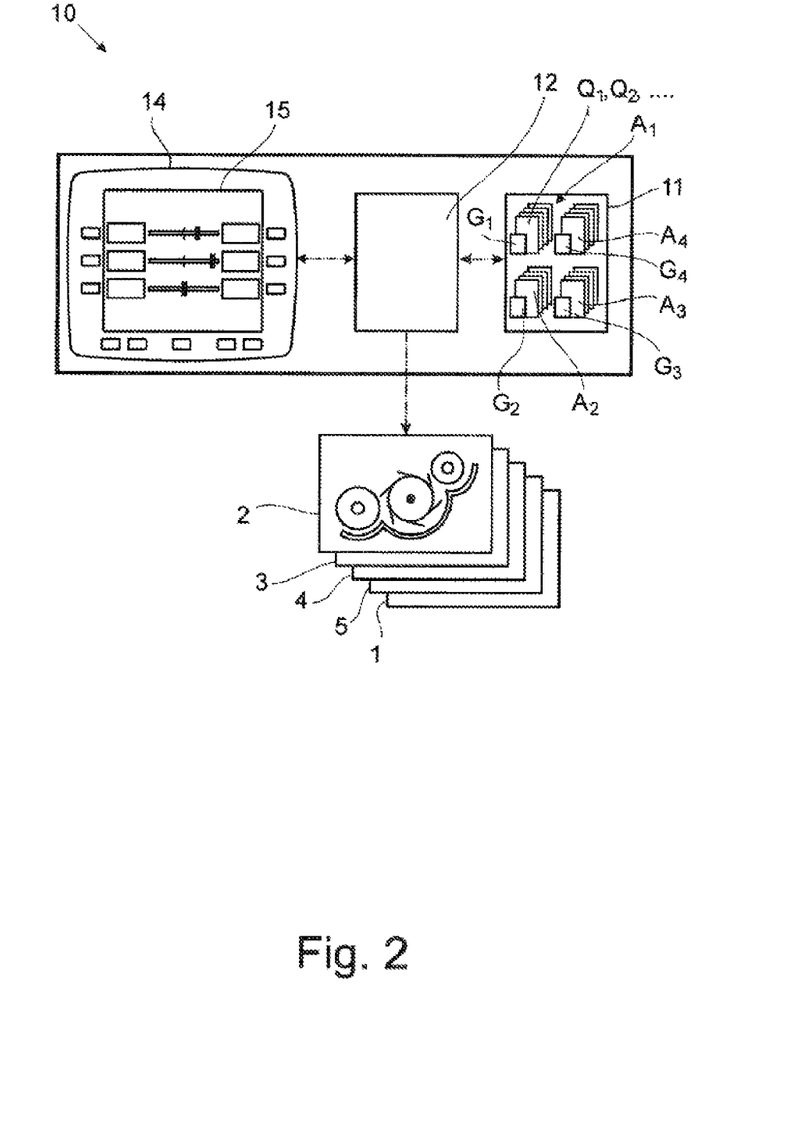
FIG. 2 shows a schematic depiction of a driver assistance system of the work machine according to FIG. 1.

The driver assistance system 10 controls the working units 1-5 according to at least one work process strategy A that can be specified by a user. The work process strategy A is aimed at fulfilling at least one quality criteria Q. With the example of a combine harvester, the quality criteria Q preferably comprise the aim of adjusting or optimizing at least one harvest process parameter such as "threshed out," "fragmented grain portion," "separation losses," "cleansing losses," "slippage of the threshing unit drive," "fuel consumption," or suchlike. The implementation of the work process strategy A occurs thereby, in the example of the threshing unit 2, primarily through the specification of the threshing unit parameters, "drum rotational rate," and "basket size."

For the implementation of the work process strategy A by means of the computing device 12, at least one implementation provision is stored in the memory 11. Various advantageous variations are conceivable for the implementation provision. In a first variation, it is provided that an implementation provision implements the determination of the machine parameters in a control process, and not in a regulating process.

Figure 3:
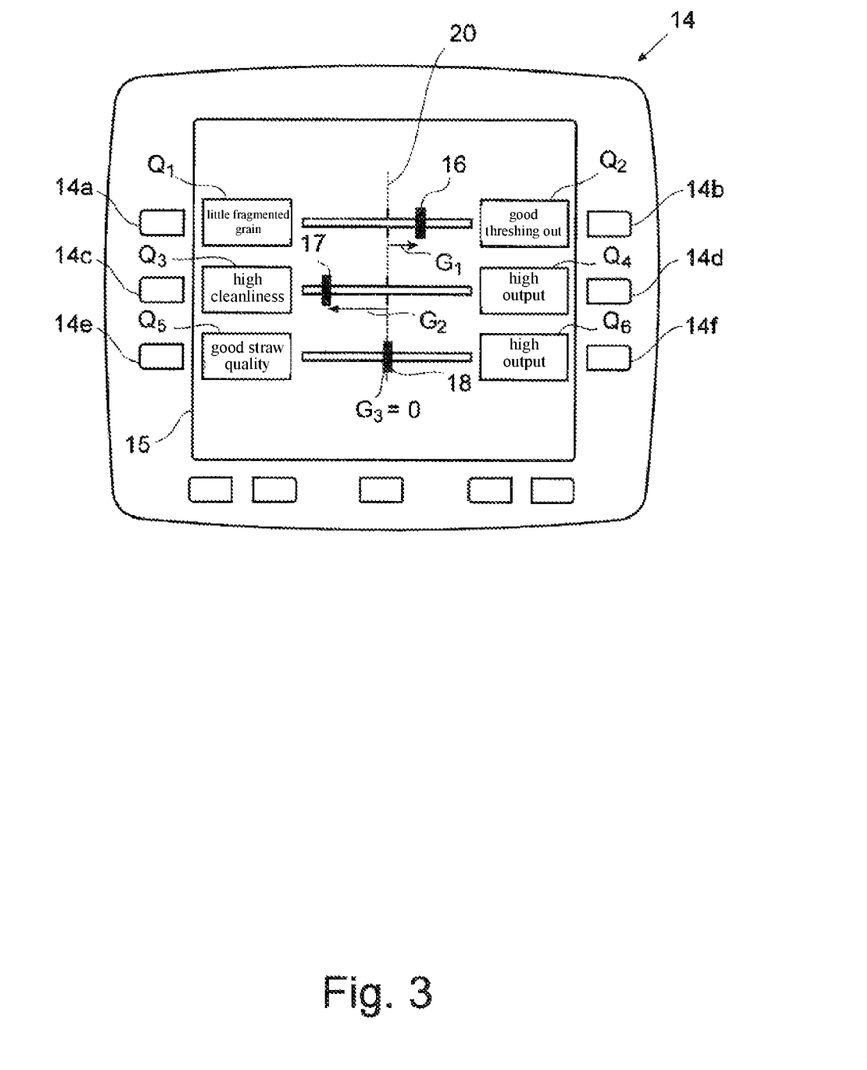
FIG. 3 shows a graphical user interface of the drive assistance system according to FIG. 2.

The driver assistance system 10 is equipped, according to one implementation, with a graphical user interface 14 having a display 15, via which at least a portion of the work process strategy A can be specified by the user. In a particular implementation, the graphical user interface 14 is a touchscreen. A specific design of the graphical user interface 14 is shown in FIG. 3.

According to one implementation, competing quality criteria Q, which are a component of the work process strategy A that can be specified by the user, are taken into account. In one specific implementation, the term "competing" may be directed to two quality criteria Q such that the fulfillment of one quality criterion Q counteracts the fulfillment of the other quality criterion Q, and vice versa. A controlling of the working units 1-5, which is aimed at fulfilling both quality criteria Q cannot be implemented with competing quality criteria Q such as these. One solution for an appropriate treatment of competing quality criteria Q is comprised of assigning a weighting variable G to the competing quality criteria Q, which represents a weighting of the competing quality criteria Q in relation to one another. In accordance with this weighting, thus in accordance with this weighting variable G, the competing quality criteria Q are weighted accordingly in relation to one another in the work process strategy A. The driver assistance system 10 may thus assign a higher priority to the quality criterion Q having the higher weighting in the control of the working units 1-5 than to a quality criterion Q having a lower weighting.

It is of interest here that the weighting variable G assigned to the competing quality criteria Q is visualized and can be specified by a user via a virtual operating element 16-19 of the graphical user interface 14. This can be derived from the depiction according to FIG. 3. It can be derived from the depiction according to FIG. 3 that the weighting variable G can be visualized and adjusted by means of the operating element 16-19 there, designed as a sliding adjuster. It is the case thereby, and preferably, that the operating element 16-19 is assigned a middle position, which represents a balanced taking into account of the competing quality criteria Q. The middle position is indicated in FIG. 3 with the reference symbol 20. A movement of the operating element 16-19 from the middle position 20 corresponds to a corresponding change to the weighting variable G.

With the exemplary embodiment depicted in FIG. 2, and preferred in this regard, it is the case that quality criteria $Q_1$, $Q_2$; $Q_3$, $Q_4$; $Q_5$, $Q_6$ competing in pairs, are each assigned a weighting variable $G_1$, $G_2$, $G_3$ as a pair. The respective weighting variable $G_1$, $G_2$, $G_3$ is visualized and can be specified accordingly by the user, via a virtual operating element 16-19 of the graphical user interface 14, as is depicted in FIG. 3. Fundamentally, it may however also be provided that an arbitrary group of competing quality criteria Q is assigned a weighting variable, which can be visualized and accordingly, specified by a user, as is proposed above. This is depicted for a group composed of three quality criteria in FIGS. 4a-b.

Figure 4:
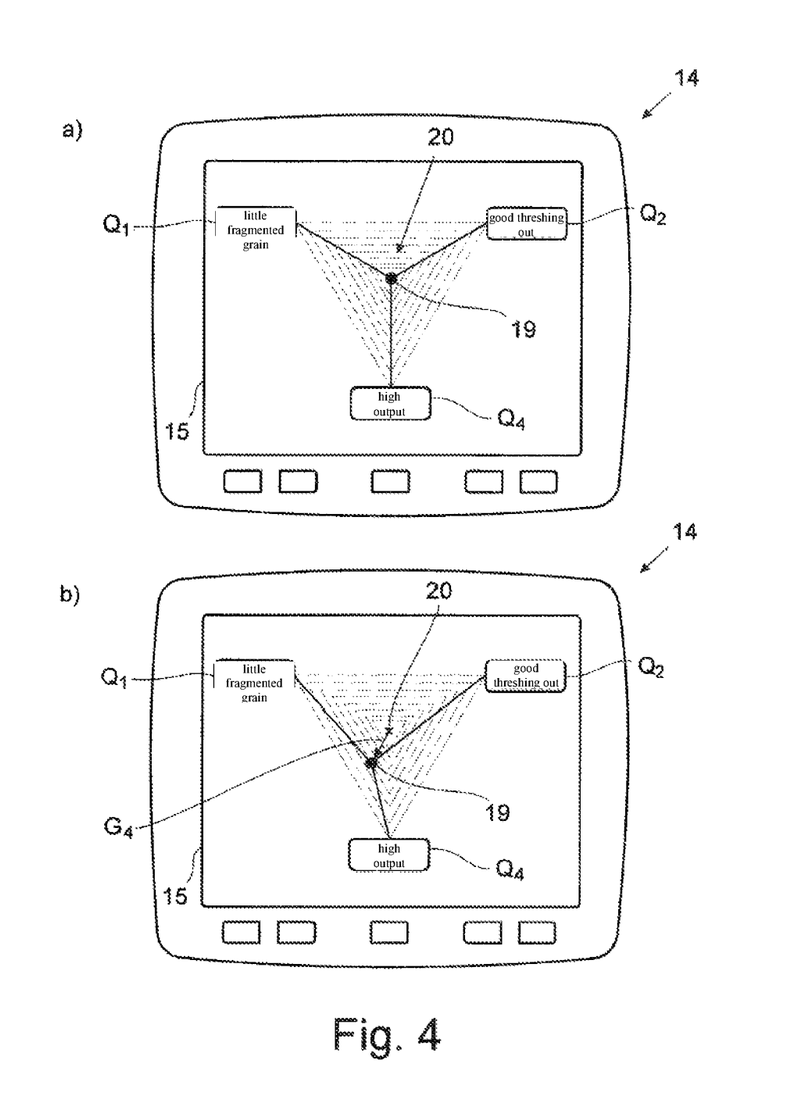
FIGS. 4a-b shows graphical user interfaces of the drive assistance system according to FIG. 2 in another embodiment.

In an overview of FIGS. 3 and 4a-b, it can be seen that the weighting variable G can be defined in entirely different ways. With the weighting variables $G_1$, $G_2$, $G_3$ depicted in FIG. 3, the respective weighting variable G is preferably assigned a single value. With the exemplary embodiment depicted in FIG. 4a, conversely, the weighting variable G can be a vector starting at the middle position 20. Accordingly, the weighting variable G is defined, for example, by an angle, indicated by the direction of the arrow, and a value, indicated by the length of the arrow.

In the exemplary embodiment depicted in FIGS. 4a-b, an operating element 19 is visualized via the graphical user interface 14, to which the three quality criteria $Q_1$, $Q_2$, $Q_4$ are assigned. By adjusting the operating element 19 from the middle position 20, a weighting can be specified between the three quality criteria $Q_1$, $Q_2$, $Q_4$. The weighting variable $Q_4$ is a vector, as addressed above, which is depicted in FIG. 4b.

For the user-side specification of the weighting variables G, it is provided here, and preferably, that the weighting variable G be able to be adjusted via the virtual operating element 16-19 by means of a drag-and-drop operation. It is preferably provided, for this, that the display 15 is designed as a touchscreen and configured to display a graphical user interface. Alternatively, it can also be provided that the operating element 16-19 be able to be adjusted via the buttons 14a-f, which are implemented as soft-keys in a particularly preferred design. In either implementation, the user may use input the weighting variables with a single hand (via 16-19) with a simple swipe or keypress.

As indicated above, the respective operating element 16-19 is visualized via the graphical user interface 14, preferably as a virtual sliding adjuster. Alternatively, it may be provided that the operating element 16-19 is visualized as a virtual rotating adjuster. Particularly with numerous competing quality criteria Q, to which a weighting variable G is to be assigned, it may be advantageous to provide a multi-dimensional operating element 20 in accordance with FIGS. 4a-b.

In general, it is preferably provided that the user-side adjustment of the operating element 16 is proportional to the change in the respective weighting variable G. For the depicted exemplary embodiments, in which the respective operating element 16-19 can be moved from a middle position 20, this means that the distance of the operating element 16-19 from the middle position 20 is proportional to the change in the weighting variable G.

The definition of the respective quality criterion Q is of particular importance here. Here and preferably, each quality criterion Q is defined in general by the aim of optimizing or adjusting a work process parameter. The term "optimizing" can comprise, in the simplest case, the maximizing or minimizing of the respective work process parameter. The term "adjusting" means that the respective work process parameter is to assume a specific value.

With a work machine designed as a combine harvester, there are a series of competing quality criteria Q, because the processes running in a combine harvester are largely dependent on one another.

A first example of two competing quality criteria $Q_1$, $Q_2$ are the adjusting or optimizing of the work process parameters "fragmented grain portion," and "threshed out." In detail it is the case here, and preferably, that this relates, for the competing quality criteria $Q_1$, $Q_2$, to the minimizing of the work process parameter "fragmented grain portion" and the maximizing of the work process parameter "threshed out." This pair of competing quality criteria $Q_1$, $Q_2$ is assigned to the operating element 16, which can be adjusted in FIG. 3 from a middle position 20 toward the work process parameter "fragmented grain portion" or toward the work process parameter "threshed out." By means of this adjustment of the operating element 16, the assigned weighting variable $G_1$, and thus the weighting of the relevant quality criteria $Q_1$, $Q_2$, can be specified accordingly. As addressed above, the threshing out can be increased through an aggressive activation of the threshing unit 2 in particular, e.g. through increasing the drum rotational rate, which, however, makes it more difficult to achieve a minimizing the work process parameter "fragmented grain portion."

Two other competing quality criteria $Q_3$, $Q_4$ are the adjusting or optimizing of the work process parameter "output" on one hand, and "cleanliness" on the other hand. In detail, the two competing quality criteria $Q_3$, $Q_4$ are the maximizing of the work process parameter "output" and the work process parameter "cleanliness." The increase in output normally results in a reduction in cleanliness, thus an increase in non-grain components, such that the two opposing quality criteria $Q_3$, $Q_4$ here, are competing quality criteria as set forth above.

Two other competing quality criteria $Q_5$, $Q_6$ correspond to the adjusting or optimizing of the work process parameters "output" and "straw quality." In detail, the two competing quality criteria $Q_5$, $Q_6$ here are the maximizing of the work process parameter "output," and the maximizing of the work process parameter "straw quality." The increase in output is normally accompanied by irregularities in the straw, thus a reduction in the straw quality, such that these are also quality criteria $Q_5$, $Q_6$ that compete with one another in this regard.

Two other, not depicted, competing quality criteria relate to the adjusting or optimizing of the work process parameter "output" and the work process parameter "losses," in particular "separation losses" and/or "cleansing losses." In detail, the two competing quality criteria are the maximizing of the work process parameter "output" and the minimizing of the work process parameter "losses." The increase in output is, at least theoretically, accompanied by an increase in losses. Accordingly, fundamentally at least one further operating element 16, 17, 18 may be provided in FIG. 3.

Fundamentally, numerous work process parameters can be comprised in a quality criterion, in order to simplify the specification of the work process strategy. Here, and preferably, this relates to the two work process parameters "output," and "fuel consumption," which each behave similarly to the other work process parameters specified herein. Accordingly, only the work process parameter "output" is included in the illustrations, to which the work process parameter "fuel consumption" can be associated.

The work process parameters shall be briefly explained below for clarification: The work process parameter "fragmented grain portion" relates to the portion of fragmented grain in the grain present in the grain tank 9. The work process parameter "threshed out" relates to the portion of grain actually threshed out in relation to the total amount of grain in the harvest. The work process parameter "output" relates to volume flow of harvest passing through the combine harvester. The work process parameter "straw quality" preferably represents the extent that a gentle threshing takes place, such that the straw is not destroyed, and as little short straw or split straw as possible is obtained. This is primarily relevant regarding the generation and storage of long straw.

Regularity of the straw separated out of the grain. The work process parameter "cleanliness" represents the extent to which the grain in the grain tank 9 is free of non-grain components.

Because the visualization of the quality criteria Q competing with one another is carried out via the graphical user interface 14, different quality criteria Q can be visualized and specified by the user, depending on the machine configuration and/or the control configuration and/or the work process status. As a result, the input possibilities through the user can be tailored to the respective present situation, such that the probability of operating errors is further reduced.

Different possibilities for implementing the respective work process strategy A are now conceivable. An entire series of work process strategies $A_1$-$A_4$ are stored in the memory 11 in the exemplary embodiment depicted in FIG. 2 and preferred in this regard. Here, and preferably, the computing device 12 is configured for implementing the respective selected work process strategy A, to autonomously determine at least one machine parameter, and to specify the respective working unit 2-5. In this manner, all of the variables relevant for the working of the working units 1-5 are activated such that they are comprehensively coordinated to one another. Thus, activations competing from different sides and potentially cancelling each other out, in particular, are avoided.

In detail, it is the case that the driver assistance system 10 meets respective assigned control measures for fulfilling the quality criteria Q, wherein the driver assistance system 10 weights the assigned control measures in accordance with the weighting variable G, for fulfilling quality criteria Q competing with one another. With the example specified above, of the quality criteria competing with one another, form minimizing the fragmented grain portion and maximizing the threshing out, the driver assistance system 10 must reduce the drum rotational rate of the threshing drum 6 in order to fulfill the first quality criterion, and increase the drum rotational rate of the threshing drum 6 in order to fulfill the second quality criterion. Based on the weighting variable G, the driver assistance system 10 generates, according to the proposal, a resulting control measure. In the theoretically simplest case, the driver assistance system 10 determines the resulting control measure through a weighted averaging, relating to the respective change in the drum rotational rate of the threshing drum 6. The latter relationships, concerning the drum rotational rate, serve merely as an explanation of the weighting variable G. In practice, increasing the drum rotational rate in order to increase the threshing out is only the "second choice," after reducing the basket size.

According to a further teaching, which is of independent importance, a method for controlling the agricultural work machine according to the proposal is claimed.

The important thing regarding the method according to the proposal is that competing quality criteria Q that are weighted in relation to one another in accordance with a weighting variable G are entered into the work process strategy A, and that the weighting variable is visualized and specified by the user via a virtual operating element 16-19 of the graphical user interface 14. Reference may be made to all of the designs for the mode of operation for the work machine according to the proposal.

LIST OF REFERENCE SYMBOLS 1 cutting unit
2 threshing unit
3 separator device
4 cleansing assembly
5 distribution assembly
6 threshing drum
7 threshing basket
8 transport assembly
9 grain tank
10 driver assistance system
11 memory
12 computing device
13 user
14 user interface
15 display
16-19 operating element
20 middle position
A work process strategy
Q quality criteria ($Q_1$-$Q_6$)
G weighting variable ($G_1$-$G_4$)

What is claimed is:

1. An agricultural work machine for processing an agricultural work process, the agricultural work machine comprising:
 a plurality of working units; and
 a driver assistance system configured to control the plurality of working units according to at least one user-side specifiable work process strategy aimed at fulfilling at least one quality criterion, wherein the driver assistance system comprises:
  a display screen configured to display an interactive graphical user interface; and
  a computing device configured to:
   generate the interactive graphical user interface to include a depiction of at least a portion of the work process strategy for assigning a quality criteria weighting strategy;
   control the display of the graphical user interface on the display screen;
   receive, through the interactive graphical user interface, the quality criteria weighting strategy, wherein the quality criteria weighting strategy assigns a weighted value for each quality criteria identified in the work process strategy; and
   reactively adapt the graphical user interface on the display screen in response to receiving the quality criteria weighting strategy.

2. The agricultural work machine according to claim 1, wherein a pairing weighting variable is assigned to respective pairs of quality criteria competing in pairs, wherein each pair of quality criteria is visualized and can be specified by a user via a virtual operating element of the interactive graphical user interface.

3. The agricultural work machine according to claim 2, wherein the virtual operating element includes a middle position corresponding to a balance of the competing quality criteria assigned to the virtual operating element in relation to one another; and
 wherein the computing device is further configured to change the weighted value for each quality criteria based on an adjusted direction of the virtual operating element from the middle position.

4. The agricultural work machine according to claim 2, wherein the pairing weighting variable is adjustable via a drag and drop operation of the virtual operating element.

5. The agricultural work machine according to claim 2, wherein the virtual operating element is visualized via the interactive graphical user interface as a virtual sliding adjuster or as a virtual rotating adjuster.

6. The agricultural work machine according to claim 2, wherein a user-side adjustment of the virtual operating element is proportional to a change in the pairing weighting variable.

7. The agricultural work machine according to claim 2, wherein the agricultural work machine is designed as a combine harvester.

8. The agricultural work machine according to claim 1, wherein two competing quality criteria correspond to adjusting or optimizing of work process parameters for "fragmented grain portion," and "threshed out," such that the two competing quality criteria represent minimizing of the work process parameter "fragmented grain portion," and maximizing of the work process parameter "threshed out".

9. The agricultural work machine according to claim 1, wherein two competing quality criteria correspond to adjusting or optimizing of work process parameters for "output" and "cleanliness," such that the two competing quality criteria represent maximizing of the work process parameter "output" and maximizing of the work process parameter "cleanliness".

10. The agricultural work machine according to claim 1, wherein two competing quality criteria correspond to adjusting or optimizing of work process parameters for "output," and "straw quality," such that the two competing quality criteria represent maximizing of the work process parameter "output," and maximizing of the work process parameter "straw quality".

11. The agricultural work machine according to claim 1, wherein work process parameters "output" and "fuel consumption" are combined, and assigned a single quality parameter.

12. The agricultural work machine according to claim 1, wherein the driver assistance system executes a visualization of the quality criteria competing with one another, depending on a machine configuration, a control configuration, or a work process status.

13. The agricultural work machine according to claim 1, wherein the computing device is configured to determine at least one machine parameter autonomously and to specify the respective working unit for implementing the respective selected work process strategy.

14. The agricultural work machine according to claim 1, wherein the driver assistance system meets respective assigned control measures for fulfilling the at least one quality criterion.

15. A method for controlling an agricultural work machine, the method comprising:
 operating a driver assistance system to control a plurality of working units included in the agricultural work machine according to at least one user-side specifiable work process strategy aimed at fulfilling at least one quality criterion;
 displaying an interactive graphical user interface on a display screen of the agricultural work machine;

generating the interactive graphical user interface to include a depiction of at least a portion of the work process strategy for assigning a quality criteria weighting strategy;

controlling the display of the graphical user interface on the display screen;

receiving, through the interactive graphical user interface, the quality criteria weighting strategy, wherein the quality criteria weighting strategy assigns a weighted value for each quality criteria identified in the work process strategy; and reactively adapting the display of the graphical user interface on the display screen in response to receiving the quality criteria weighting strategy.

16. The method of claim 15, wherein a pairing weighting variable is assigned to respective pairs of quality criteria competing in pairs, wherein each pair of quality criteria is visualized and can be specified by the user via a virtual operating element of the interactive graphical user interface.

17. The method of claim 16, wherein the virtual operating element includes a middle position corresponding to a balance of the competing quality criteria assigned to the virtual operating element in relation to one another; and wherein the method further comprises changing the weighted value for each quality criteria based on an adjusted direction of the virtual operating element from the middle position.

18. The method of claim 15, wherein two competing quality criteria ($Q_1$, $Q_2$) correspond to the adjusting or the optimizing of the work process parameters for "fragmented grain portion," and "threshed out," such that the two competing quality criteria ($Q_1$, $Q_2$) represent minimizing of the work process parameter "fragmented grain portion," and the maximizing of the work process parameter "threshed out".

19. The method of claim 15, wherein two competing quality criteria ($Q_3$, $Q_4$) correspond to the adjusting or the optimizing of the work process parameter "output" and "cleanliness," such that the two competing quality criteria ($Q_3$, $Q_4$) represent maximizing of the work process parameter "output" and the maximizing of the work process parameter "cleanliness".

20. The method of claim 15, wherein two competing quality criteria ($Q_5$, $Q_6$) correspond to the adjusting or the optimizing of the work process parameter for "output," and "straw quality," such that the two competing quality criteria ($Q_5$, $Q_6$) represent maximizing of the work process parameter "output," and the maximizing of the work process parameter "straw quality".

* * * * *

UNITED STATES PATENT AND TRADEMARK OFFICE
CERTIFICATE OF CORRECTION

PATENT NO. : 10,126,929 B2
APPLICATION NO. : 15/354688
DATED : November 13, 2018
INVENTOR(S) : Joachim Baumgarten et al.

Page 1 of 1

It is certified that error appears in the above-identified patent and that said Letters Patent is hereby corrected as shown below:

On the Title Page

Item (71):
"CLAAS Selbstfahrende Ernternaschinen GmbH"
Should be replaced with:
--"CLAAS Selbstfahrende Erntemaschinen GmbH"--

Signed and Sealed this
Fifteenth Day of January, 2019

Andrei Iancu
*Director of the United States Patent and Trademark Office*